US009157514B2

United States Patent
Morrow et al.

(10) Patent No.: US 9,157,514 B2
(45) Date of Patent: Oct. 13, 2015

(54) ADJUSTING MEANS WITH A SPINDLE GEAR UNIT

(75) Inventors: Michael Morrow, Coburg (DE); Chris Wagner, Ahorn (DE); Stefan Schulze, Roedental (DE); Holger Steinmueller, Bad Neustadt (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 129 days.

(21) Appl. No.: 13/876,478

(22) PCT Filed: Sep. 24, 2011

(86) PCT No.: PCT/EP2011/004789
§ 371 (c)(1),
(2), (4) Date: Jun. 20, 2013

(87) PCT Pub. No.: WO2012/041468
PCT Pub. Date: Apr. 5, 2012

(65) Prior Publication Data
US 2013/0269459 A1    Oct. 17, 2013

(30) Foreign Application Priority Data

Sep. 28, 2010  (DE) .......................... 10 2010 041 570

(51) Int. Cl.
*F16H 3/06* (2006.01)
*F16H 27/02* (2006.01)
(Continued)

(52) U.S. Cl.
CPC ............ *F16H 25/2015* (2013.01); *B60N 2/164* (2013.01); *B60N 2/1853* (2013.01); *B60N 2/233* (2013.01); *B60N 2/443* (2013.01); *B60N 2205/20* (2013.01); *Y10T 74/18576* (2015.01)

(58) Field of Classification Search
CPC ............ F16H 57/025; B60N 2002/024; B60N 2/1853; B60N 2/443; B60N 2/164; B60N 2/233; B60N 2/067; B60N 2002/0236
USPC ............... 74/89.14, 89.23, 89.34, 424.7, 425, 74/606 R; 248/393, 429; 296/65.01; 297/284.11, 330, 362.11, 362.12, 297/362.14
See application file for complete search history.

(56) References Cited

U.S. PATENT DOCUMENTS 3,617,021 A    11/1971   Littmann
4,802,374 A    2/1989    Hamelin et al.
(Continued)

FOREIGN PATENT DOCUMENTS

CN    1752482 A    3/2006
CN    1890129 A    1/2007
(Continued)

OTHER PUBLICATIONS

English translation of the International Preliminary Report on Patentability for corresponding PCT/EP2011/004789, dated Mar. 28, 2013, 5 pages.
(Continued)

*Primary Examiner* — David M Fenstermacher
*Assistant Examiner* — Jake Cook
(74) *Attorney, Agent, or Firm* — Christie, Parker & Hale, LLP

(57) ABSTRACT

An adjuster for pivotally adjusting two vehicle parts to each other, is provided, the adjuster including a spindle pivotally arranged on the one vehicle part about a first pivot axis, an adjusting gear unit which includes a gear unit housing and is in engagement with the spindle via a spindle nut, and a holder arranged at the other vehicle part, which pivotally supports the adjusting gear unit on the other vehicle part about a second pivot axis and for this purpose at least partly encloses the gear unit housing of the adjusting gear unit in circumferential direction about the second pivot axis. The holder may be formed by a plastic retaining clip to form a light-weight and inexpensive adjuster that has high strength in operation.

12 Claims, 6 Drawing Sheets

(51) Int. Cl.

*F16H 29/02* (2006.01)
*F16H 29/20* (2006.01)
*F16H 25/20* (2006.01)
*B60N 2/16* (2006.01)
*B60N 2/18* (2006.01)
*B60N 2/23* (2006.01)
*B60N 2/44* (2006.01)

(56) References Cited

U.S. PATENT DOCUMENTS

| | | | |
|---|---|---|---|
| 5,163,335 | A | 11/1992 | Isom et al. |
| 5,203,231 | A * | 4/1993 | Minegishi et al. ........... 74/606 R |
| 6,257,541 | B1 * | 7/2001 | Timon et al. ................... 248/429 |
| 6,322,146 | B1 * | 11/2001 | Fisher, Jr. ................ 297/362.14 |
| 2005/0126333 | A1 | 6/2005 | Dohles et al. |
| 2006/0060015 | A1 | 3/2006 | Hofschulte et al. |
| 2006/0260424 | A1 * | 11/2006 | Becker et al. ................. 74/89.23 |
| 2006/0278037 | A1 | 12/2006 | Borbe et al. |
| 2008/0047377 | A1 | 2/2008 | Becker et al. |
| 2009/0152920 | A1 | 6/2009 | Gumbrich et al. |
| 2010/0213341 | A1 | 8/2010 | Beneker et al. |
| 2010/0320352 | A1 * | 12/2010 | Weber ........................... 248/429 |

FOREIGN PATENT DOCUMENTS

| | | |
|---|---|---|
| DE | 33 03 198 A1 | 8/1984 |
| DE | 37 24 038 A1 | 2/1989 |
| DE | 90 02 766.3 U1 | 7/1991 |
| DE | 43 31 822 A1 | 3/1995 |
| DE | 199 04 079 A1 | 8/2000 |
| DE | 101 13 153 C1 | 4/2002 |
| DE | 100 44 851 A1 | 6/2002 |
| DE | 102 50 994 A1 | 8/2003 |
| DE | 203 04 949 U1 | 8/2004 |
| DE | 10 2004 063 538 A1 | 7/2006 |
| DE | 10 2006 005 499 A1 | 11/2006 |
| DE | 10 2006 051 085 A1 | 2/2008 |
| DE | 10 2007 030 445 A1 | 3/2008 |
| DE | 10 2007 039 361 A1 | 5/2008 |
| DE | 10 2007 027 410 A1 | 12/2008 |
| DE | 10 2008 017 017 A1 | 12/2008 |
| DE | 10 2008 046 000 A1 | 6/2009 |
| EP | 0 609 627 A1 | 8/1994 |
| EP | 0 759 374 A2 | 2/1997 |
| FR | 2 871 416 B1 | 12/2005 |
| JP | 4444401 B2 | 3/2010 |
| RU | 42799 U1 | 12/2004 |
| WO | WO 01/60656 A1 | 8/2001 |
| WO | WO 03/068551 A1 | 8/2003 |
| WO | WO 2007/124811 A2 | 11/2007 |

OTHER PUBLICATIONS

International Search Report of corresponding PCT/EP2011/004789, dated Dec. 23, 2011, 6 pages.

CN Office action for Application No. 201180047026.6, dated Apr. 3, 2015, and English translation, 13 pages.

* cited by examiner

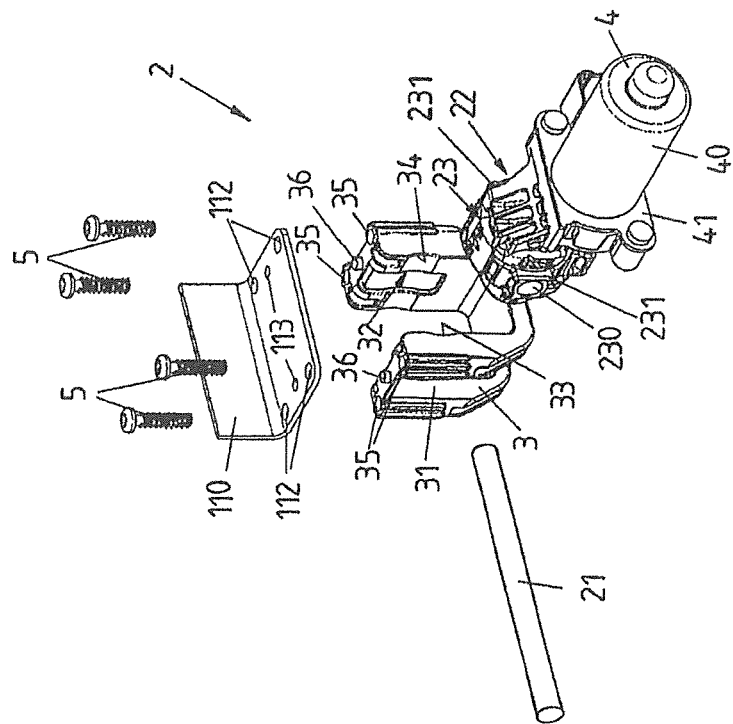
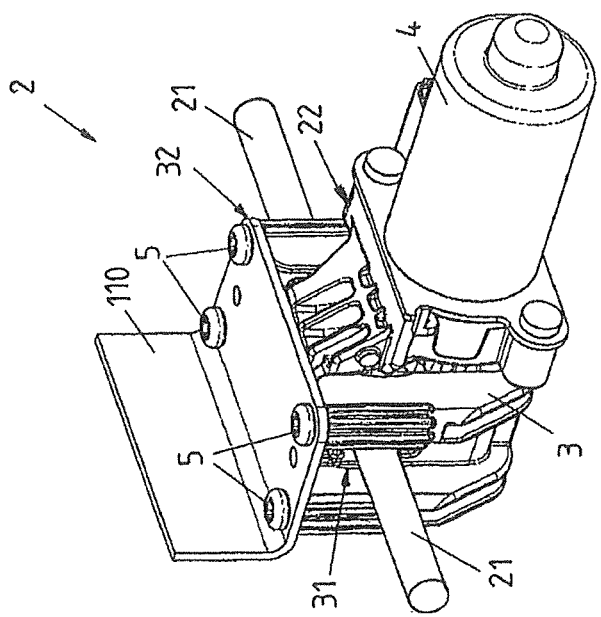

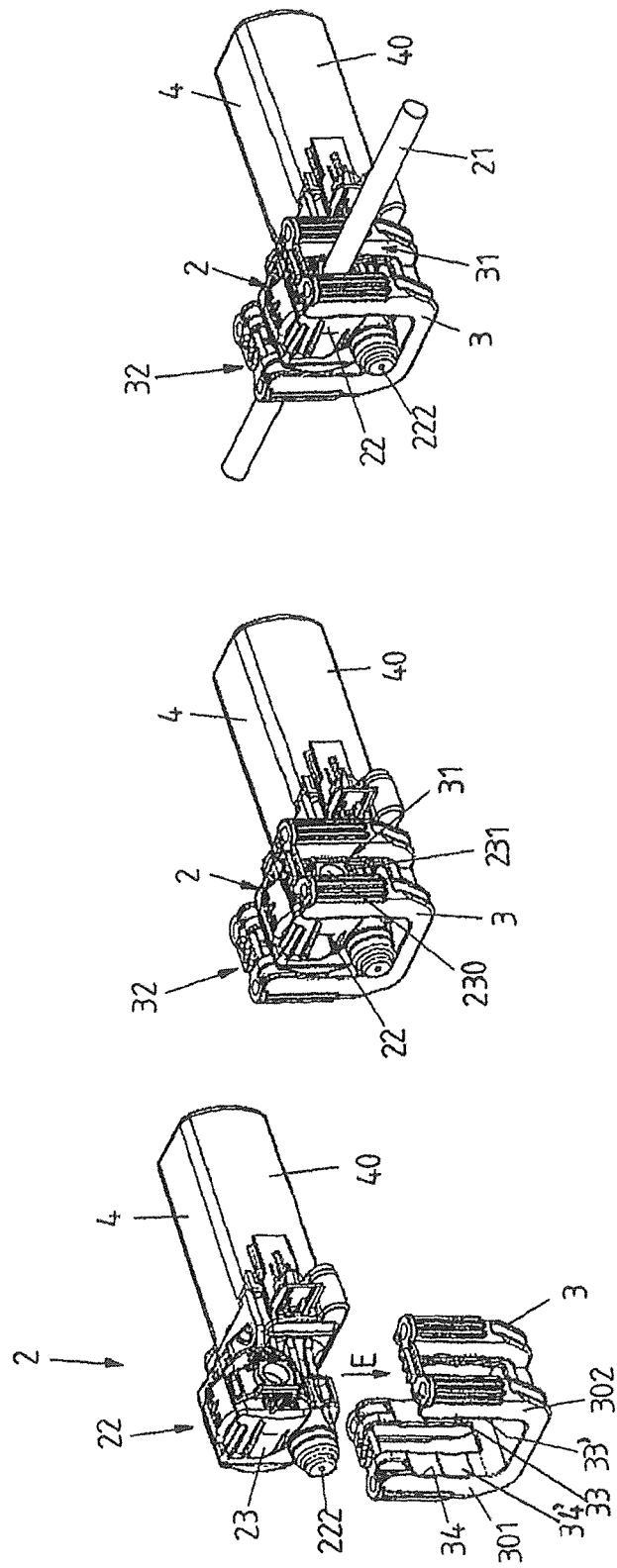

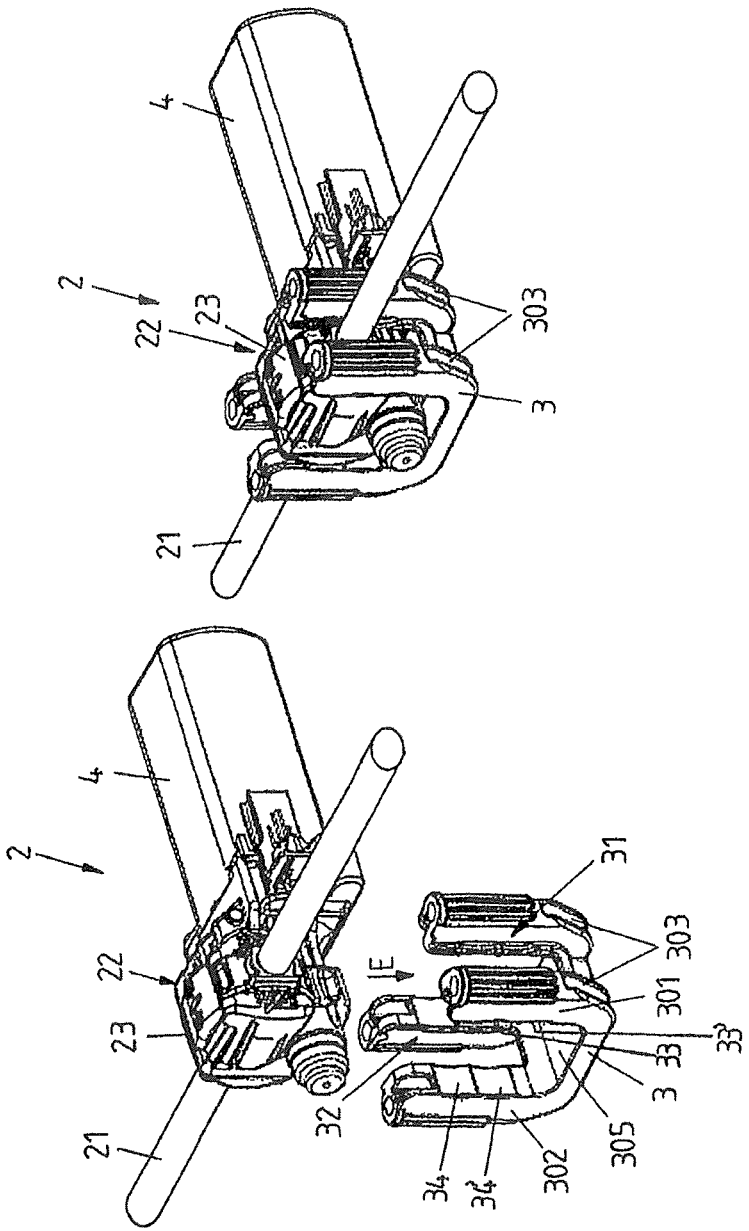

ADJUSTING MEANS WITH A SPINDLE GEAR UNIT

CROSS-REFERENCE TO RELATED APPLICATION(S)

This application is a National Phase Patent Application and claims priority to and benefit of International Application Number PCT/EP 2011/004789, filed on Sep. 24, 2011, which claims priority to and benefit of German Patent Application Number 10 2010 041 570.7, filed on Sep. 28, 2010, the entire disclosure of which are incorporated herein by reference.

This invention relates to an adjusting means for pivotally adjusting two vehicle parts relative to each other according to the generic part of claim 1.

Such an adjusting means includes a spindle pivotally arranged at the one vehicle part about a first pivot axis and an adjusting gear unit. The adjusting gear unit comprises a gear unit housing and is in engagement with the spindle via a spindle nut. A holder arranged at the other vehicle part pivotally supports the adjusting gear unit on the other vehicle part about a second pivot axis and for this purpose at least partly encloses the gear unit housing of the adjusting gear unit in circumferential direction about the second pivot axis.

Such adjusting means forming a spindle gear unit can find a variety of uses in a vehicle. An adjusting means of this type for example can serve for adjusting the inclination of a backrest, for adjusting the tilt position of a seat part, for adjusting a headrest, a lordosis support or other pivotally arranged vehicle at parts. Such adjusting means however also can likewise be employed at a vehicle door or at other movable parts of a vehicle, in order to suitably adjust components pivotable relative to each other.

In an adjusting means of this type, which is known from DE 102 50 994 A1, an adjusting gear unit together with a drive motor is pivotally arranged as motor-transmission unit at an associated vehicle part via a bearing shell. The adjusting gear unit includes a spindle nut which via an internal toothing is in engagement with an external toothing of a spindle and can be put into a rotary movement via a drive worm driven by the drive motor. In operation, the spindle nut rolls off on the spindle and thus moves along the spindle, so as to move the vehicle parts to be adjusted relative to each other.

The vehicle parts to be adjusted are pivotally mounted relative to each other. The spindle is pivotally mounted on the one vehicle part about the first pivot axis and the adjusting gear unit, which is in engagement with the spindle, is pivotally mounted on the other vehicle part about the second pivot axis, no that a triple joint is obtained, in which the vehicle parts are coupled via the spindle pivotally mounted on the one vehicle part and connected with the other vehicle part via the spindle gear unit, the distance between the connecting points of the spindle with the vehicle parts is varied by shifting the adjusting gear unit along the spindle, and the vehicle parts thus are pivoted relative to each other.

Because the angular position of the spindle relative to the vehicle parts also is varied when pivoting the vehicle parts relative to each other, the adjusting gear unit is pivotally mounted on the associated vehicle part, so that the relative movement between vehicle parts and spindle can be compensated and the adjusting gear unit can pivot relative to the associated vehicle part corresponding to the angular position of the spindle.

The bearing shell of DE 102 50 994 A1 circumferentially encloses the gear unit housing of the adjusting gear unit and with partly cylindrical bearing surfaces forms a plain bearing for the adjusting gear unit. Because the bearing shell is fabricated of a metallic material, in order to be suitable for absorbing crash forces and to satisfy the strength requirements for supporting the adjusting gear unit, the holder of DE 102 50 994 A1 in the form of the bearing shell is heavy and considerably contributes to the weight of the adjusting means.

Another type of an adjusting means with such holder made of metal is known from DE 203 04 949 U1.

In an adjusting means known from DE 10 2006 005 499 A1 a holder is formed an extruded profile piece of aluminum. Corresponding to the extrusion direction, mounting holes for fixing the holder at the associated vehicle part are aligned parallel to the pivot axis of the adjusting gear unit. This leads to the disadvantage that the adjusting means only can be fixed at the associated vehicle part by screwing parallel to the pivot axis, i.e. the screwing direction cannot be chosen freely. In addition, in the arrangement of DE 10 2006 005 499 A1, the adjusting means cannot be supplied as pre-mounted assembly together with the holder, because the adjusting gear unit only can be arranged at the holder and be connected with a drive motor arranged on a side of the vehicle part facing away from the holder, when the holder is mounted.

It is the object of the present invention to provide an adjusting means which can be formed light-weight and inexpensive, yet with a high strength in operation.

This object is solved by a subject-matter with the features of claim 1.

Accordingly, it is provided that the holder is formed by a plastic retaining clip.

The plastic retaining clip in particular can be formed as a one-piece injection-molded plastic part. The plastic retaining clip at least partly encloses the gear unit housing of the adjusting gear unit in circumferential direction about the second pivot axis and thus forms a plain bearing for the adjusting gear unit. For this purpose, the friction pairing between the plastic retaining clip and the gear unit housing advantageously likewise made of plastic can be chosen and adapted such that a smooth-running bearing of the adjusting gear unit is obtained at the plastic retaining clip.

The present invention proceeds from the idea to use a plastic retaining clip instead of a heavy-weight holder made of metal for supporting the adjusting gear unit on the associated vehicle part. In this way, the weight of the holder is reduced considerably, and the holder can be manufactured in a large number as plastic retaining clip in an inexpensive way, for example as injection-molded plastic part. Due to the one-piece formation of the plastic retaining clip and stiffening means possibly provided thereon, the strength of the plastic retaining clip can be adjusted such that it can safely and reliably absorb also the load forces occurring in the case of a crash.

Preferably, the plastic retaining clip is partly open as seen in circumferential direction about the second pivot axis, and the adjusting gear unit can be attached to the retaining clip in an insertion direction vertical to the second pivot axis. The plastic retained clip can be formed U-shaped with two lateral legs and a base connecting the legs, wherein the plastic retaining clip is partly elastic, so that the adjusting gear unit can be inserted into the U-shaped receptacle of the plastic retaining clip and supportingly be brought in engagement with the plastic retaining clip. At the legs of the plastic retaining clip and possibly also at the base bearing surfaces are formed, which in their shape correspond to portions of a cylinder shell surface concentric to the second pivot axis (of the adjusting gear unit) and thus are formed partly cylindrical, and against which the gear unit housing of the adjusting gear unit slidingly rests with its suitably formed outer wall.

For mounting the adjusting gear unit at the plastic retaining clip, the adjusting gear unit is inserted into the plastic retaining clip from the open side of the plastic retaining clip and snaps into place between the legs of the plastic retaining clip, when the gear unit housing of the adjusting gear unit comes to rest against the bearing surfaces of the legs and/or the base. Due to the at least partly elastic formation of the plastic retaining clip, mounting the adjusting gear unit at the plastic retaining clip can be effected in a simple way without great physical effort.

Due to the fact that the plastic retaining clip is formed partly open in circumferential direction as seen about the second pivot axis, the adjusting gear unit can be inserted into the retaining clip in a direction vertical to the second pivot axis, wherein inserting preferably is effected in a clipping manner, in that the adjusting gear unit is pressed between the legs of the plastic retaining clip and with its gear unit housing gets in contact with the bearing surfaces of the plastic retaining clip. Due to an at least small elastic pretension of the legs of the plastic retaining clip, the adjusting gear unit is retained at the plastic retaining clip at least largely free from backlash.

To provide a plastic retaining clip of high strength, which also can absorb the load forces acting in the case of a crash, the plastic retaining clip advantageously includes one or more profile portions extending in a U-shaped manner, offset to each other in direction of the second pivot axis, with webs protruding to the outside radially to the second pivot axis and extending about the second pivot axis in circumferential direction. Due to these profile portions, the rigidity of the plastic retaining clip is selectively adjusted and increased, wherein advantageously two profile portions are used, which are connected with each other via at least one connecting web and/or at least one surface portion. Due to the webs of the profile portions extending about the second pivot axis in circumferential direction and radially protruding to the outside, the dimensional stability of the plastic retaining clip is increased in particular in a plane vertical to the second pivot axis, so that for example in use at a vehicle seat, in which load forces occurring in the case of a crash preferably act in this plane, the load forces can be absorbed safely and reliably.

The plastic retaining clip preferably can have two bearing surfaces at its legs, which are diametrically opposed and provide a plain bearing for supporting the adjusting gear unit. In one development it can, however, also be provided that the plastic retaining clip includes four bearing surfaces for supporting the adjusting gear unit, two of which are formed in pairs for supporting the adjusting gear unit in a first insertion position and two are formed for supporting the adjusting gear unit in a second insertion position. Two bearing surfaces each can be arranged at one leg of the plastic retaining clip offset to each other along the insertion direction (vertical to the second pivot axis), wherein each bearing surface at one leg is diametrically opposed to an associated bearing surface at the other leg. The bearing surfaces associated to each other in pairs serve for supporting the adjusting gear unit in different insertion positions and for example provide for inserting the adjusting gear unit into the plastic retaining clip with a drive worm below the spindle nut or above the spindle nut.

To fix the plastic retaining clip at the associated vehicle part, a holding bracket preferably is provided for connection with the associated vehicle part. This holding bracket for example is connected with the plastic retaining clip via one or more screw connections, wherein for this purpose the plastic retaining clip includes a number of mounting bores corresponding to the number of screw connections, which extend longitudinally in a plane vertical to the second pivot axis, i.e. are directed substantially vertically to the second pivot axis.

The mounting bores for example can be designed as blind holes, wherein the screw connections are designed with a self-cutting thread and are made on the part of the holding bracket.

The screws serving to make the screw connection engage in the plastic retaining clip and in this way can serve as sectionwise armor (also referred to as reinforcement) of the plastic retaining clip to increase the stability in particular in transverse direction transversely to the second pivot axis in longitudinal direction of the spindle.

The screw connection can be made in that the screws are screwed into the plastic retaining clip from the side of the holding bracket facing away from the plastic retaining clip. It is, however, also conceivable to screw the screws the other way round from the side of the plastic retaining clip and bring the same in connection with suitable nuts through corresponding cutouts at the holding bracket.

In this connection it can also be advantageous to injection-mold one or more screws into the plastic retaining clip and thus firmly mold the same into the plastic retaining clip. For this purpose, a threaded rod can also be used, which for example is bent U-shaped corresponding to the shape of the plastic retaining clip and is injection-molded into the plastic retaining clip, no that the threaded rod serves as armor of the plastic retaining clip extending in circumferential direction.

In an alternative aspect, the plastic retaining clip also can be clipped to the holding bracket, wherein it is also conceivable to clip the holding bracket on the one hand and on the other hand fix it at the plastic retaining clip with screw connections. For example, one leg of a U-shaped plastic retaining clip can be clipped to the holding bracket, whereas the other leg of the U-shaped plastic retaining clip is screwed to the holding bracket.

Clipping here is understood to be the creation of a positive connection by using suitable latching elements which create a clipping connection between the holding bracket and the plastic retaining clip.

Via the holding bracket, the plastic retaining clip unilaterally open in circumferential direction is closed. Via the holding bracket, the plastic retaining clip hence is completed and the elasticity is removed from the plastic retaining clip, so that the adjusting gear unit is securely held between the legs of the plastic retaining clip, but at the same time is pivotally mounted.

Via the holding bracket, the plastic retaining clip furthermore is fixed at the associated vehicle part, wherein the adjusting means with the spindle, the adjusting gear unit and the plastic retaining clip as well as the holding bracket arranged at the plastic retaining clip can be manufactured and delivered as pre-mounted unit, in order to be mounted as unit at the vehicle parts to be adjusted, for example at components of a vehicle seat.

To be able to easily arrange the holding bracket at the plastic retaining clip in a desired position in connection with an automated manufacture, at least one centering pin can be provided at a portion of the plastic retaining clip facing the holding bracket, which protrudes from the plastic retaining clip in direction of the holding bracket and engages into a centering opening of the holding bracket. The centering pin serves for centering the holding bracket relative to the plastic retaining clip and is brought in engagement with the associated centering opening of the holding bracket for fixing the holding bracket at the plastic retaining clip, so that when the centering pin is in engagement, it can be assumed that the holding bracket and the plastic retaining clip are in the desired positional relation to each other.

The plastic retaining clip circumferentially encloses the gear unit housing of the adjusting gear unit as holder for the adjusting gear unit. The adjusting gear unit thus is arranged inside the plastic retaining clip and at least partly covered by the plastic retaining clip in circumferential direction around the second pivot axis. To accomplish the engagement of the adjusting gear unit with the spindle, the plastic retaining clip therefore includes cutouts at its circumferential surface for leading through the spindle, which are formed as oblong holes and either are circumferentially closed or circumferentially open. In the latter variant, the oblong holes in particular are formed open towards that side towards which the plastic retaining clip also is formed open, so that the adjusting gear unit with spindle arranged thereon can be attached to the plastic retaining clip in an insertion direction vertical to the second pivot axis and the spindle can be introduced into the cutouts from the open side.

Advantageously, at least one guide pin is formed at the gear unit housing, which protrudes from the gear unit housing in radial direction to the second pivot axis and engages into a cutout at the plastic retaining clip.

The guide pin here can perform three functions.

Firstly, the guide pin can serve as axial retention of the adjusting gear unit at the plastic retaining clip, an that the adjusting gear unit cannot easily slip out of the plastic retaining clip in direction of the second pivot axis, when the adjusting gear unit is attached to the plastic retaining clip.

Secondly, the guide pin can serve as guide for the adjusting gear unit in operation of the adjusting means when pivoting the adjusting gear unit relative to the plastic retaining clip, in that in operation of the adjusting means the guide pin slides in the associated cutout and provides a sliding guidance for the adjusting gear unit.

Thirdly, the guide pin also can provide a guidance when attaching the adjusting gear unit to the plastic retaining clip, in that during attachment of the adjusting gear unit to the plastic retaining clip the guide pin is inserted into the associated cutout and during insertion slides along the cutout, so as to guide the insertion process of the adjusting gear unit.

Preferably, two guide pins are provided at the gear unit housing, which are diametrically opposed and engage into different cutouts of the plastic retaining clip. The guide pins preferably can be formed as square profile, so as to provide a secure axial retention, a guidance during pivoting in operation of the adjusting means, and a guidance during insertion of the adjusting gear unit into the plastic retaining clip.

At the guide pin, there can also be arranged an opening for leading through the spindle, so that via the guide pins the spindle is introduced into the adjusting gear unit and is brought in engagement with the spindle nut enclosed by the gear unit housing.

The adjusting gear unit preferably is connected with a drive motor and pivotable together with the drive motor. For this purpose, the drive motor with its motor housing can be flange-mounted to the gear unit housing and be connected by means of screws or rivets. It is, however, also conceivable to clip the drive motor into a suitable motor holder and correspondingly positively hold it at the gear unit housing.

The adjusting gear unit thus forms a motor-transmission unit with the drive motor, which is pivotally mounted at the associated vehicle part via the plastic retaining clip. It is also conceivable here to not directly mount the adjusting gear unit, but to pivotally mount the drive motor via the plastic retaining clip. In this connection it is decisive that the adjusting gear unit is pivotally mounted at the associated vehicle part (possibly indirectly via the drive motor).

The idea underlying the invention will be explained in detail below with reference to the exemplary embodiments illustrated in the Figures, in which:

FIG. 2 shows a separate view of the adjusting means;

FIG. 3 shows an exploded view of the adjusting means;

FIGS. 5A-5C show views of the adjusting means during assembly;

FIGS. 6A-5C show views of a modified embodiment of the adjusting means during assembly; and FIGS. 7A, 7B show views of an again modified embodiment of the adjusting means.

Figure 1:
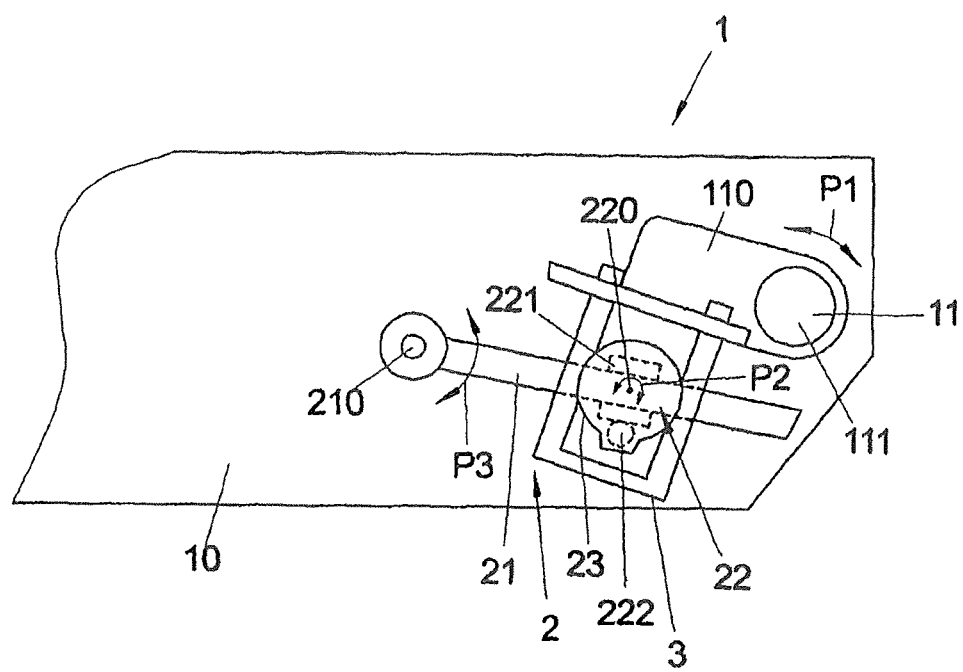
FIG. 1 shows a schematic view of a seat frame of a vehicle seat with an adjusting means arranged thereon in the form of a spindle gear unit.

FIG. 1 shows a schematic side view of a seat frame 10 of a vehicle seat with an adjusting means 2 arranged thereon. The adjusting means 2 is formed as spindle gear unit with a spindle 21 arranged around a pivot axis 210 at the seat frame 10 and an adjusting gear unit 22 connected with a shaft 11 and can serve for example for the tilt adjustment of a seat part coupled with the shaft for the purpose of the seat height or seat tilt adjustment of the vehicle seat 1.

The adjusting gear unit 22 is formed by a spindle nut 221 in engagement with an external toothing of the spindle 21 via an internal toothing and by a drive worm 222 driven via a drive motor 4 (see e.g. FIG. 2), which engages into an external toothing of the spindle nut 221.

The adjusting gear unit 22 is at least partly enclosed by a gear unit housing 23, which is pivotally connected with the shaft 11 via a holder in the form of a plastic retaining clip 3. For this purpose, the plastic retaining clip 3 is connected with a holding bracket 110 made of metal, for example steel, which in turn is fixed, for exampled welded, to the shaft.

The gear unit housing 23 preferably is formed of plastic, wherein the plastic retaining clip 3 and the gear unit housing 23 can be adjusted to each other in their friction pairing such that an advantageous plain bearing with little friction is obtained.

The shaft 11 realizing a first vehicle part is pivotable about the pivot axis 111, whereas the adjusting gear unit 22 is pivotally arranged at the plastic retaining clip 3 about the pivot axis 220. Via the pivot axis 210, the spindle 21 in turn is pivotally arranged at the seat frame 10 realizing a second vehicle part, wherein the pivot axis 210 extends vertically to the direction of longitudinal extension of the spindle 21 and pivot axes 111, 210, 220 are directed at least substantially parallel to each other, so that a triple joint is obtained.

In operation of the adjusting means 2, the drive worm 222, driven by the drive motor 4 (see FIG. 2), moves the spindle nut 221 and puts the same into a rotary movement, so that by engagement with the external toothing of the spindle 21 it rolls off on the spindle 21 and is shifted longitudinally along the spindle 21. In this way, the distance between the adjusting gear unit 22 and the pivot axis 210, via which the spindle 21 is pivotally arranged at the seat frame 10, is varied, so that the shaft 11 is pivoted via the lever arm formed between the pivot axis 220 of the adjusting gear unit 22 and the pivot axis 111 of the shaft 11.

To compensate the changed angular position of the spindle 21, which in operation moves in direction of the arrow P3 about the pivot axis 210, the adjusting gear unit 22 also pivots within the plastic retaining clip 3 in direction of the arrow P2. Via the retaining wraparound of the plastic retaining clip 3, the adjustment forces are transmitted to the holding bracket 110 and via the holding bracket 110 to the shaft 11, so that the shaft 11 pivots about its pivot axis 111 in direction of the arrow P1.

Figure 4:
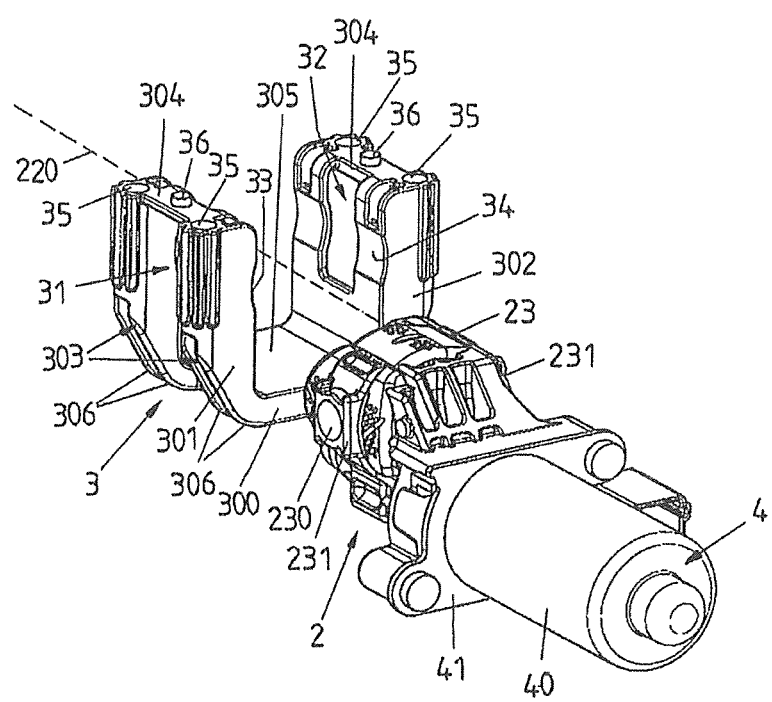
FIG. 4 shows a separate view of a plastic retaining clip and a motor-transmission unit of the adjusting means.

Views of a first concrete exemplary embodiment of the adjusting means 2 are shown in FIGS. 2 to 4. The adjusting means 2 includes a drive Motor 4 which via a flange portion 41 arranged at a motor housing 40 is connected with the gear unit housing 23 of the adjusting gear unit 22 and together with the adjusting gear unit 22 forms a motor-transmission unit. The adjusting gear unit 22 is arranged in the plastic retaining clip 3 via the gear unit housing 23, wherein the plastic retaining clip 3 includes bearing surfaces 33, 34 which correspondingly are formed by portions of a shell surface of a cylinder concentric to the pivot axis 222 and are in contact with the gear unit housing 23, which at least partly likewise is formed curved. The plastic retaining clip 3 thus forms a plain bearing for the gear unit housing 23, which pivotally connects the adjusting gear unit 22 with the holding bracket 110 about the pivot axis 220.

The plastic retaining clip 3 is formed of plastic, for example as injection-molded plastic part. The plastic clip 3 is at least so elastic that the adjusting gear unit 22 with the gear unit housing 23 can be inserted into the plastic retaining clip 3 from above in an insertion direction E vertical to the pivot axis 220 (see also FIG. 5A), in order to bring the gear unit housing 23 in contact with the bearing surfaces 33, 34.

As shown in FIG. 4, the plastic retaining clip 3 is formed substantially U-shaped with lateral legs 301, 302 and a base 300 connecting the legs 301, 302. The U-shaped plastic retaining clip 3 is formed by two U-shaped bent profile portions 303 offset to each other along the pivot axis 220, which each extend about the pivot axis 220 in circumferential direction and include webs 306 radially protruding to the outside.

Via the profile portions 303, which on the side of the base 300 are connected with each other by a surface portion 305 and at the upper end of the legs 301, 302 each by a web 304, a dimensionally stable plastic part is created, which provides for inserting the adjusting gear unit 23 in the insertion direction E, but has such a strength in operation that it can safely and reliably absorb the load forces acting in the case of a crash.

As shown in FIGS. 2 and 3, the plastic retaining clip 3 is connected with the holding bracket 110 in that the holding bracket 110 closes the U-shaped plastic retaining clip 3 on its circumferentially open side, which in the views is the upper side, and is fixed at the plastic retaining clip 3 via screws 5, which extend through mounting openings 112 of the holding bracket 110 and engage into mounting bores 35 at the legs 301, 302 of the plastic retaining clip 3. The mounting bores 35 here are designed as blind holes and merely open on their side facing the holding bracket 110, wherein the screw connections made via the screws 5 are manufactured with a self-cutting thread.

Due to the design of the mounting bores 35 as blind holes, the stability of the plastic retaining clip 3 is further increased. It is, however, also conceivable to design the mounting bores 35 as continuous bores open on both sides.

The plastic retaining clip 3 includes lateral cutouts 31, 32 arranged at the legs 301, 302, through which the spindle 21 reaches in the mounted condition (see FIG. 2) and is in engagement with the adjusting gear unit 22. The cutouts 31, 32 are arranged between the profile portions 303, as seen in axial direction to the pivot axis 220, and formed as oblong holes, so that in operation of the adjusting means 2 the spindle 21 can pivot relative to the plastic retaining clip 3, without getting in contact with the plastic retaining clip 3.

At the gear unit housing 23 of the adjusting gear unit 2 two guide pins 231 are arranged diametrically opposite to the pivot axis 220, which in the mounted condition of the adjusting means 2 come to lie in the cutouts 31, 32. These guide pins 231 are formed in the manner of a square and serve to guide the gear unit housing 23 at the cutouts 31, 32 in operation of the adjusting means 2, when pivoting about the pivot axis 220. In addition, the guide pins 231 provide an axial retention for the adjusting gear unit 22, which prevents that in the mounted condition the adjusting gear it 22 with its gear unit housing 23 can slip out of the plastic retaining clip 3 in axial direction along the pivot axis 220. Furthermore, the guide pins 231 also serve to facilitate the assembly, as will yet be explained below.

At the connecting webs 304 connecting the profile portions 303 with each other at the upper ends of the legs 301, 302 centering pins 36 each are arranged approximately centrally between the mounting bores 35, which protrude from the end face of the legs 301, 302 in direction of the holding bracket 110 and in the mounted condition engage into centering openings 113 at the holding bracket 110. These centering pins 36 serve to facilitate the assembly when connecting the holding bracket 110 with the plastic retaining clip 3 and fix the position of the holding bracket 110 relative to the plastic retaining clip 3.

The procedure during assembly of the adjusting means 2 is shown in FIGS. 5A to 5C. FIG. 5A initially shows the condition before attachment of the adjusting gear unit 22 to the plastic retaining clip 3. FIG. 5B shows the condition with the adjusting gear unit 22 attached to the plastic retaining clip 3. FIG. 5C shows the condition with the spindle 21 attached to the adjusting gear unit 22.

For assembly, the adjusting gear unit 22 with the drive motor 4 arranged thereon is inserted as motor-transmission unit into the plastic retaining clip 3 in insertion direction E, by pressing the gear unit housing 23 of the adjusting gear unit 22 from above into the U-shaped receptacle created between the legs 301, 302 of the plastic retaining clip 3, until the gear unit housing 23 snaps into engagement with the bearing surfaces 33, 34. For this purpose, the plastic retaining clip 3 is formed at least so elastic that the legs 301, 302 can yield to the outside at least by a small distance and the adjusting gear unit 22 with the gear unit housing 23 thus can be pressed between the legs 301, 302 of the plastic retaining clip 3.

When attaching the gear unit housing 23 to the plastic retaining clip 3, the guide pins 231 of the gear unit housing 23 are inserted into the cutouts 31, 32 of the legs 301, 302 and in this way guide the insertion process of the gear unit housing 23 into the U-shaped receptacle of the plastic retaining clip 3.

In the attached condition, shown in FIG. 5B, the gear unit housing 23 of the adjusting gear unit 22 is located between the legs 301, 302 in contact with the bearing surfaces 33, 34 and is, as shown in FIG. 5C, brought in engagement with the spindle 21, in that same is attached to the opening 230 at one of the guide pins 231 and, advantageously by actuating the drive motor 4, is retracted into the adjusting gear unit 22. FIG. 5C shows the spindle 21 in engagement with the adjusting gear unit 22.

After the spindle 21 has been introduced into the adjusting gear unit 22, the plastic retaining clip 3, as shown in FIG. 2, is connected with the holding bracket 110, in that the screws 5 are screwed into the mounting bores 35 in a thread-cutting manner through the mounting opening 112 of the holding bracket 110. By connecting the holding bracket 110 with the plastic retaining clip 3, the plastic retaining clip 3 is fixed and the elasticity required for assembly is removed from the plastic retaining clip 3, so that in particular the legs 301, 302 of the plastic retaining clip 3 are fixed in their position to each other and firmly and securely connect the adjusting gear unit 22 with the holding bracket 110 via the gear unit housing 23 and with the shaft 11 via the holding bracket 110 (see FIG. 1). In the condition connected with the holding bracket 110, the plastic retaining clip 3 can absorb the load forces acting in the case of a crash safely and reliably.

The exemplary embodiment as shown in FIGS. 5A to 5C is slightly modified as compared to the exemplary embodiment of FIGS. 2 to 4, since at the legs 301, 302 of the plastic retaining clip 3 two bearing surfaces 33, 33', 34, 34' each are formed, i.e. a total of four bearing surfaces 33, 33', 34, 34' are formed at the plastic retaining clip 3. The bearing surfaces 33, 33' and 34, 34' at one leg 301, 302 each are offset to each other along the insertion direction E, wherein each of the bearing surfaces 33, 33', 34, 34' has associated thereto a diametrically opposed bearing surface 33, 33', 34, 34' at the other leg 301, 302.

The first bearing surface pair of the bearing surfaces 33, 34 and the second bearing surface pair of the bearing surfaces 33', 34' form two different plain bearings for the adjusting gear unit 22 in different insertion positions.

By means of the first bearing surface pair of the bearing surfaces 33, 34, as shown in FIGS. 5B and 5C, the adjusting gear unit 22 can be arranged in a position at the plastic retaining clip 3, in which the drive worm 222 is arranged below the spindle nut 221, i.e. on the side of the spindle 21 facing away from the holding bracket 110.

By means of the second bearing surface pair of the bearing surfaces 33', 34', however, the adjusting gear unit 22 can be arranged in a position at the plastic retaining clip 3, in which the drive worm 222 is arranged above the spindle nut 221, i.e. on the side of the spindle 21 facing the holding bracket 110.

For different arrangements of the adjusting gear unit 22, a uniform plastic retaining clip 3 hence can be used.

Independent of whether it is formed with merely two bearing surfaces 33, 34 or 33', 34 or with a total of four bearing surfaces 33, 33', 34, 34', the plastic retaining clip 3 can be manufactured with one and the same tool, wherein for example for plastic injection molding different slides are used in dependence on the number and position of the bearing surfaces 33, 33', 34, 34'.

Figure 6A:
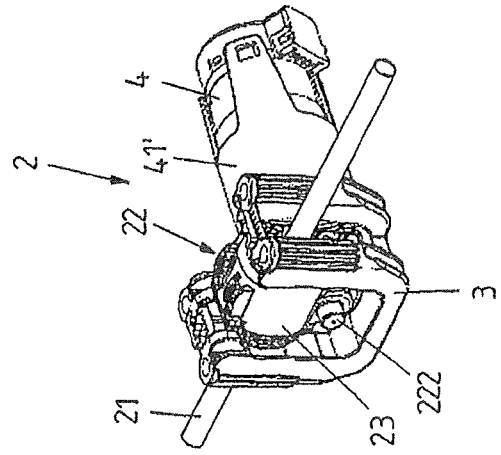
Figure 6B:
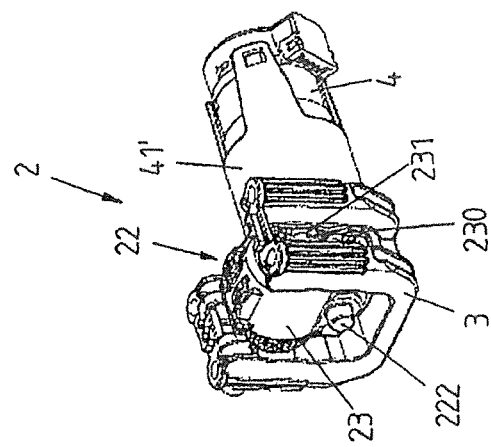
Figure 6C:
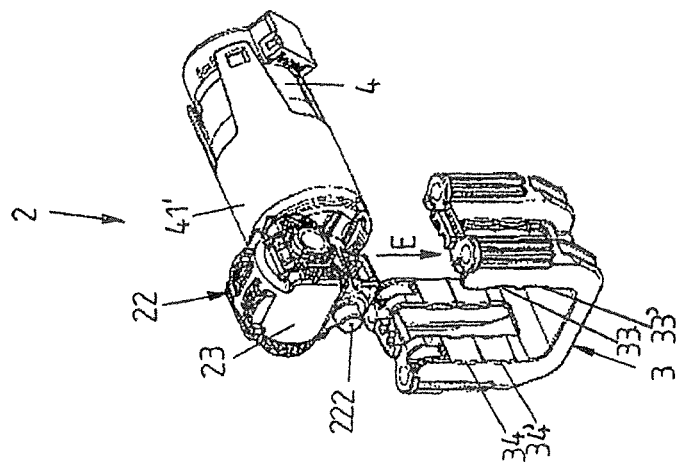

FIGS. 6A to 6C show a modified embodiment of an adjusting means 2, which differs from the above-described adjusting means in particular in that the drive motor 4 is not flange-mounted to the gear unit housing 23, but is clipped to the gear unit housing 23 via a motor holder 41' and thus is positively connected with the gear unit housing 23. For this purpose, the drive motor 4 can be inserted into the motor holder 41' in direction of the direction of extension of the drive worm 222 and in the inserted condition latches with the motor holder 41'.

The mode of operation of the adjusting means 2 and also the assembly process otherwise are identical to the one described above. Correspondingly, the same reference numerals have been used for the designation of components of the same function.

FIGS. 7A and 7B in turn show a modified exemplary embodiment, which differs from the aspect of FIGS. 2 to 4 in that in the exemplary embodiment of FIGS. 7A and 7B the plastic retaining clip 3 is formed with cutouts 31, 32 which are not closed, but open towards the end faces of the legs 301, 302 of the U-shaped plastic retaining clip 3. Webs 304, as they are provided in the exemplary embodiment of FIGS. 2 to 4, are omitted here. This has the advantage that the adjusting gear unit 22 together with the spindle 21 arranged thereon is attached to the plastic retaining clip 3 in the insertion direction E and thus before attaching the adjusting gear unit 22 to the plastic retaining clip 3, the spindle 21 can be brought in engagement with the adjusting gear unit 22.

After the adjusting gear unit 22 has been attached to the plastic retaining clip 3, as shown in FIG. 7B, the plastic retaining clip 3 in turn is connected with the holding bracket 110, wherein via the holding bracket 110 the profile portions 303 of the plastic retaining clip 3 also are fixed relative to each other at their upper ends facing the holding bracket 110, and the plastic retaining clip 3 thus obtains the required stability and strength.

The idea underlying the invention is not limited to the exemplary embodiments described above but can also be realized in completely different embodiments.

In particular, the possibilities of use of an adjusting means as described above are conceivable and advantageous for adjusting other vehicle parts, independent of a vehicle seat.

The holding bracket is not necessarily screwed to the plastic retaining clip, but for example can also be clipped to the plastic retaining clip, in that suitable latching elements at the holding bracket and plastic retaining clip are positively brought in engagement with each other. What is also conceivable is a combination, in that for example one leg of the plastic retaining clip is screwed and the other leg of the plastic retaining clip is clipped to the holding bracket.

LIST OF REFERENCE NUMERALS 1 vehicle seat
10 seat frame
11 shaft
110 holding bracket
111 pivot axis
112 mounting opening
113 centering opening
2 adjusting means
21 spindle
210 pivot axis
22 adjusting gear unit
220 pivot axis
221 spindle nut
222 drive worm
23 gear unit housing
230 opening
231 guide pin
3 plastic retaining clip
300 base
301, 302 leg
303 profile portions
304 connecting web
305 surface portion
306 webs
31, 32 cutout
33, 33', 34, 34' bearing surface
35 mounting bores
36 centering pin
4 drive motor
40 motor housing
41 flange portion
41' motor holder
5 screws
E insertion direction
P1, P2, P3 arrow

The invention claimed is:
1. An adjuster for pivotally adjusting two vehicle parts relative to each other, the adjuster comprising a spindle pivotally arranged at a first of the two vehicle parts about a first pivot axis, an adjusting gear unit including a gear unit housing and being in engagement with the spindle via a spindle nut, and a holder arranged at a second of the two vehicle parts, wherein the holder supports the adjusting gear unit on the second vehicle part about a second pivot axis in that the holder at least partly encloses the gear unit housing of the adjusting gear unit in a circumferential direction about the second pivot axis, wherein the holder is formed by a plastic retaining clip which is formed U-shaped with two lateral legs and a base connecting the legs, wherein the plastic retaining clip includes two first bearing surfaces at its legs, wherein the two first bearing surfaces are diametrically opposed to the second pivot axis and provide a plain bearing for supporting the adjusting gear unit in that the first bearing surfaces are formed by portions of a cylinder shell surface concentric to the second pivot axis, wherein the gear unit housing of the adjusting gear unit slidingly rests against the first bearing surfaces so that the adjusting gear unit is pivotally mounted between the legs, wherein the plastic retaining clip is connected with a holding element of the second vehicle part via a screw connection and includes at least one mounting bore which extends longitudinally in a plane vertical to the second pivot axis.

2. The adjuster according to claim 1, wherein the plastic retaining clip is elastically deformable at at least one section.

3. The adjuster according to claim 1, wherein the plastic retaining clip includes two profile portions extending in a U-shaped manner and being offset to each other in a direction of the second pivot axis, wherein the profile portions comprise protruding webs extending in a circumferential direction about the second pivot axis.

4. The adjuster according to claim 3, wherein the profile portions are connected with each other via at least one connecting web or at least one surface portion.

5. The adjuster according to claim 1, wherein the plastic retaining clip includes two additional, second bearing surfaces for supporting the adjusting gear unit, wherein the two first bearing surfaces are constituted for supporting the adjusting gear unit in a first insertion position and the two second bearing surfaces are constituted for supporting the adjusting gear unit in a second insertion position.

6. The adjuster according to claim 1, wherein the screw connection is designed with a self-cutting thread.

7. The adjuster according to claim 1, wherein the holding element closes the plastic retaining clip in a circumferential direction about the second pivot axis.

8. An adjuster for pivotally adjusting two vehicle parts relative to each other, the adjuster comprising:

a spindle pivotally arranged at a first of the two vehicle parts about a first pivot axis, an adjusting gear unit including a gear unit housing and being in engagement with the spindle via a spindle nut, and a holder arranged at a second of the two vehicle parts, wherein the holder supports the adjusting gear unit on the second vehicle part about a second pivot axis in that the holder at least partly encloses the gear unit housing of the adjusting gear unit in a circumferential direction about the second pivot axis, wherein the holder is formed by a plastic retaining clip which is formed U-shaped with two lateral legs and a base connecting the legs, wherein the plastic retaining clip includes two first bearing surfaces at its legs, wherein the two first bearing surfaces are diametrically opposed to the second pivot axis and provide a plain bearing for supporting the adjusting gear unit in that the first bearing surfaces are formed by portions of a cylinder shell surface concentric to the second pivot axis, wherein the gear unit housing of the adjusting gear unit slidingly rests against the first bearing surfaces so that the adjusting gear unit is pivotally mounted between the legs, wherein at a portion of the plastic retaining clip facing a holding element of the second vehicle part at least one centering pin engaging into a centering opening of the holding element is arranged for centering the holding element relative to the plastic retaining clip.

9. The adjuster according to claim 8, wherein the plastic retaining clip is clipped to the holding element.

10. The adjuster according to claim 1, wherein at the gear unit housing at least one guide pin is formed which protrudes from the gear unit housing in a radial direction to the second pivot axis and engages into a cutout at the plastic retaining clip.

11. The adjuster according to claim 10, wherein the at least one guide pin, in cross section, comprises a square profile.

12. The adjuster according to claim 10, wherein the at least one guide pin includes an opening for leading through the spindle.

* * * * *